(12) United States Patent
Brunelle et al.

(10) Patent No.: US 7,687,595 B2
(45) Date of Patent: Mar. 30, 2010

(54) SULFONATED TELECHELIC POLYCARBONATES

(75) Inventors: Daniel J. Brunelle, Burnt Hills, NY (US); Martino Colonna, Bologna (IT); Maurizio Fiorini, Anzola Emilia (IT); Corrado Berti, Lugo (IT); Enrico Binassi, Bologna (IT)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 197 days.

(21) Appl. No.: 11/834,417

(22) Filed: Aug. 6, 2007

(65) Prior Publication Data

US 2009/0043071 A1    Feb. 12, 2009

(51) Int. Cl.
*C08G 64/00*    (2006.01)
*C08G 63/02*    (2006.01)

(52) U.S. Cl. .......................... 528/196; 528/86; 528/171; 528/198; 528/199; 528/373

(58) Field of Classification Search .................. 528/86, 528/171, 196, 198, 199, 373
See application file for complete search history.

(56) References Cited

U.S. PATENT DOCUMENTS

| | | | |
|---|---|---|---|
| 5,162,405 A | 11/1992 | Macleay et al. |
| 5,412,061 A | 5/1995 | King, Jr. et al. |
| 5,644,017 A | 7/1997 | Drumright et al. |
| 5,650,470 A | 7/1997 | McCloskey et al. |
| 5,807,962 A | 9/1998 | Drumright et al. |
| 6,303,737 B1 | 10/2001 | Lemmon et al. |
| 6,323,304 B1 | 11/2001 | Lemmon et al. |
| 6,376,640 B1 | 4/2002 | Lemmon et al. |
| 6,930,164 B1 | 8/2005 | Brunelle et al. |
| 2003/0050427 A1 | 3/2003 | Brunelle et al. |

*Primary Examiner*—Terressa M Boykin

(57) ABSTRACT

A sulfonated telechelic polycarbonate is described which is produced by melt synthesis. A dihydroxy compound is reacted with a sulfobenzoic acid salt, then with an activated carbonate. The method results in a sulfonated telechelic polycarbonate which has a high percentage of sulfonated end groups, is soluble, and is transparent.

22 Claims, 4 Drawing Sheets

Telechelic Sulfonated Polycarbonate

SULFONATED TELECHELIC POLYCARBONATES

CROSS-REFERENCE TO RELATED APPLICATIONS

The present disclosure is related to the patent application entitled "POLYCARBONATE NANOCOMPOSITES," concurrently filed as U.S. Ser. No. 11/834,458. The present disclosure is also related to the patent application entitled "ACTIVATED ESTERS FOR SYNTHESIS OF SULFONATED POLYCARBONATE", concurrently filed as U.S. Ser. No. 11/834,437. These disclosures are hereby fully incorporated herein by reference.

BACKGROUND

The present disclosure relates to sulfonated telechelic polycarbonates and to methods of producing the same. For example, the disclosure relates, in certain embodiments, to the melt synthesis of sulfonated telechelic polycarbonates and to the compositions produced by such a process.

Polycarbonates are synthetic thermoplastic resins derived from bisphenols and phosgene, or their derivatives. They are linear polyesters of carbonic acid and can be formed from dihydroxy compounds and carbonate diesters, or by ester interchange. Their desired properties include clarity or transparency (i.e. 90% light transmission or more), high impact strength, heat resistance, weather and ozone resistance, good ductility, being combustible but self-extinguishing, good electrical resistance, noncorrosive, nontoxic, etc.

Polycarbonates can be manufactured by processes such as melt polymerization, i.e. melt synthesis. Generally, in the melt polymerization process, polycarbonates may be prepared by co-reacting, in a molten state, dihydroxy compound(s) and a diaryl carbonate ester in the presence of a transesterification catalyst in a Banbury® mixer, twin screw extruder, or other batch stirred reactor designed to handle highly viscous materials, to form a uniform dispersion. Volatile monohydric phenol is removed from the molten reactants by distillation and the polycarbonate polymer is isolated as a molten residue. Melt processes are generally carried out in a series of stirred tank reactors. The reaction can be carried out by either a batch mode or a continuous mode. The apparatus in which the reaction is carried out can be any suitable tank, tube, or column. Continuous processes usually involve the use of one or more continuous-stirred tank reactors (CSTRs) and one or more finishing reactors.

The presence of low concentrations of covalently bonded ionic substituents in organic polymers is well known to produce a consistent effect on their physical and rheological properties. Indeed, ionomers (polymers containing less than 10 mole percent of ionic groups) have been shown to exhibit considerably higher moduli and higher glass transition temperatures compared to those of their non-ionic analogues. Improvements in mechanical and thermal performance are generally attributed to the formation of ionic aggregates, which act as thermo-reversible cross-links and effectively retard the translational mobility of polymeric chains. The thermo-reversible nature of ionic aggregation may address many other disadvantages associated with covalently bonded high molecular weight polymers, such as poor melt processability, high melt viscosity, and low thermal stability at typical processing conditions such as high shear rate and temperature.

It is also reported in the literature that ionic interactions alter the crystallization kinetics and resulting morphology, decreasing the level of crystallinity. Telechelic ionomers (i.e. having only functionalized end groups) provide electrostatic interactions without a deleterious effect on the symmetry of the repeating unit. Moreover, the ionic aggregation will occur only at the end of the chain, giving rise to an electrostatic chain extension while random ionomers give rise to a gel-like or cross linked aggregation. For this reason, lower melt viscosities and higher molecular weights should be more easily obtained for telechelic ionomers compared to random ionomers.

U.S. Pat. No. 5,644,017 reported the preparation of telechelic polycarbonates by melt and interfacial methods. It claimed that polycarbonate ionomers presented a strong non-Newtonian melt rheology behavior along with increased solvent and flame resistance.

The '017 patent reported a melt method for the synthesis of telechelic sulfonated polycarbonates by a one-pot reaction of the phenyl ester of sulfobenzoic acid sodium salt (SBENa), bisphenol-A (BPA), and diphenyl carbonate (DPC). However, this method gave rise to a consistently high amount of degradation products. Furthermore, the material obtained was completely insoluble in dichloromethane. The dark yellow product was not soluble in any common organic solvents, nor in strong solvents such as hexafluoroisopropanol or trifluoroacetic acid, and therefore could not be characterized by GPC or NMR. This insolubility has been ascribed to crosslinking due to the formation of Fries rearrangement by-products. It may be due to the high catalyst content (25 ppm of lithium hydroxide) and/or the temperature program used during polymerization. The '017 patent also claimed two glass transition temperatures (at 148° C. and at 217° C.). This fact suggests the presence of two separable components: one with sulfonated end groups, and one without.

The '017 patent also reported solution methods for the preparation of telechelic sulfonated polycarbonates, via 3- or 4-chlorosulfonyl benzoic acid. Example 2 reported a Tg of 165° C. for the 4-isomer, but no Tg was reported in Example 3 for the 3-isomer. Both polymers had very low molecular weights; the 4-isomer had a $M_w$ of 21,210 or a degree of polymerization (DP) of 44, while the 3-isomer had a much lower $M_w$ (since 20% of the sulfonated end groups were incorporated) and a theoretical DP of only 8. Polycarbonates having a $M_w$ of less than 30,000 are usually not useful because they lack the required mechanical properties. The polycarbonate of Example 3 also contained sulfonated groups as integral parts of the polymer backbone (i.e. not pendant from the chain). However, this type of mixed carbonic-sulfonic anhydride linkage is very thermally unstable and would ultimately cause the polycarbonate to fragment into several chains of lower molecular weight wherever such an anhydride linkage occurred, especially during thermal processing. As such, any polycarbonate with anhydride functionality would not be very useful.

It would be desirable to provide telechelic sulfonated polycarbonates having low crosslinking and high transparency.

BRIEF DESCRIPTION

Disclosed, in various embodiments, are telechelic sulfonated polycarbonates and methods for producing such polycarbonates.

In embodiments, a method for the melt synthesis of a telechelic sulfonated polycarbonate comprises:

reacting a mixture comprising a dihydroxy compound and a sulfobenzoic acid salt to obtain an intermediate product;

adding an activated carbonate to the mixture; and reacting the intermediate product with the activated carbonate to obtain the telechelic sulfonated polycarbonate;
wherein the dihydroxy compound has the structure of Formula (I):

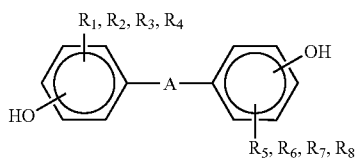

Formula (I)

wherein $R_1$ through $R_8$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic;

the sulfobenzoic acid salt has the structure of Formula (II):

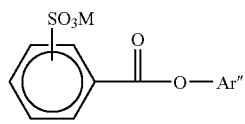

Formula (II)

wherein M is an alkali metal; and Ar″ is an aromatic ring; and
the activated carbonate has the structure of Formula (III):

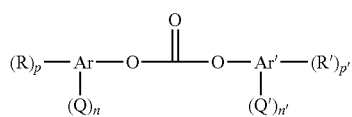

Formula (III)

wherein each Q or Q′ is independently selected from alkoxycarbonyl, halogen, nitro, amide, sulfone, sulfoxide, imine, and cyano; Ar and Ar′ are independently aromatic rings; n and n′ are independently whole numbers from zero up to the number of replaceable hydrogen groups on each aromatic ring Ar and Ar′, wherein (n+n′)≧1; p is an integer from zero up to the number of replaceable hydrogen groups on aromatic ring Ar minus n; p′ is an integer from zero up to the number of replaceable hydrogen groups on aromatic ring Ar′ minus n′; and each R or R′ is independently selected from alkyl, substituted alkyl, cycloalkyl, alkoxy, aryl, alkylaryl having from 1 to 30 carbon atoms, cyano, nitro, halogen, and carboalkoxy.

The molar ratio of dihydroxy compound to sulfobenzoic acid salt may be from about 99.9:0.1 to about 90:10.

The dihydroxy compound and sulfobenzoic acid salt may be reacted at a temperature of from about 190° C. to about 230° C. The dihydroxy compound and sulfobenzoic acid salt may be reacted for a period of from about 60 minutes to about 120 minutes. The dihydroxy compound and sulfobenzoic acid salt may be reacted at a pressure of from about 1.0 bar to about 1.5 bar. The pressure may be reduced to a range of from about 50 millibar to about 200 millibar after the activated carbonate is added. The temperature may be increased to a temperature of from about 250° C. to about 280° C. while the intermediate product and the activated carbonate are reacted. The pressure may be reduced to a pressure of from about 0.01 millibar to about 2 millibar while the intermediate product and the activated carbonate are reacted. The intermediate product and the activated carbonate may be reacted for a period of from about 30 minutes to about 120 minutes.

The mixture may further comprise a catalyst. The catalyst may be a system of tetramethyl ammonium hydroxide (TMAH) and sodium hydroxide (NaOH).

The telechelic sulfonated polycarbonate may have a weight average molecular weight of greater than 30,000.

The dihydroxy compound may be 2,2-bis(4-hydroxyphenyl)propane (bisphenol-A). The sulfobenzoic acid salt may be the phenyl ester of sulfobenzoic acid sodium salt. The activated carbonate may be bis(methyl salicyl)carbonate (BMSC).

In other embodiments, a method for the synthesis of a telechelic sulfonated polycarbonate comprises:
reacting a mixture comprising bisphenol-A, a phenyl ester of a sulfobenzoic acid sodium salt, and a catalyst to obtain an intermediate product; and
reacting the intermediate product with bis(methylsalicyl) carbonate (BMSC) to obtain the telechelic sulfonated polycarbonate.

The mixture may be reacted for about 90 minutes at a temperature of about 210° C.

The method may further comprise reducing the pressure to 130 millibar during the reaction of the intermediate product with BMSC.

After the pressure is reduced to 130 millibar, the temperature may be increased to about 260° C. and the pressure may be further reduced to about 0.1 millibar.

In embodiments, a telechelic sulfonated polycarbonate, wherein at least 70 mole percent of the end groups of the polycarbonate are sulfonates, is of Formula (VI):

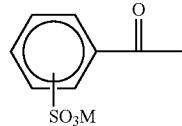

Formula (VI)

wherein M is an alkali metal; and the backbone of the polycarbonate contains no sulfonate groups.

The polycarbonate may be formed from the reaction of a dihydroxy compound and a diaryl carbonate ester. The polycarbonate may be completely soluble in chloroform. The polycarbonate may be transparent. The polycarbonate may have a weight average molecular weight of greater than 30,000.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
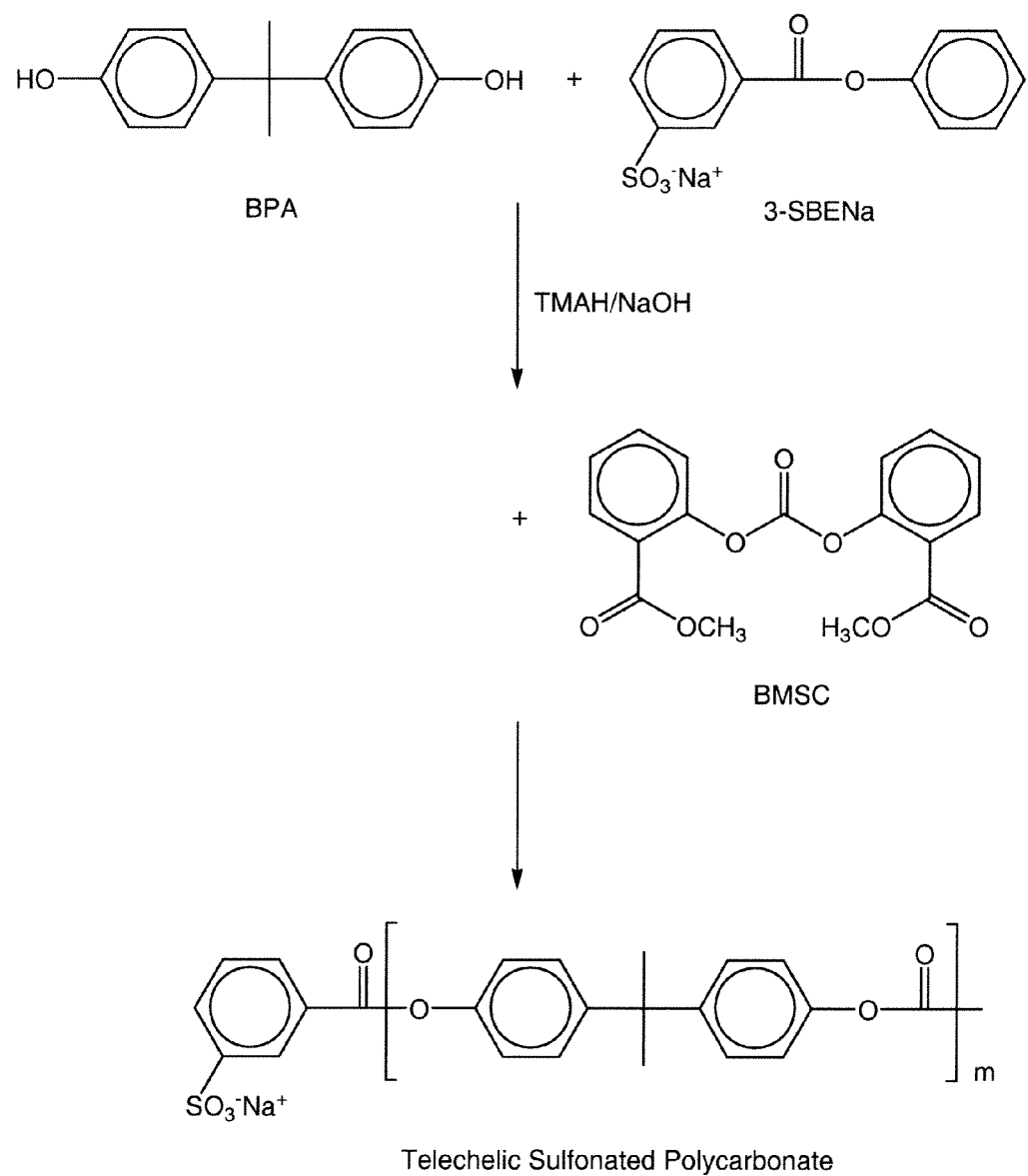
FIG. 1 is a diagram illustrating the methods of the present disclosure.

A more complete understanding of the components, processes and apparatuses disclosed herein can be obtained by reference to the accompanying drawings. These drawings are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

As used herein, "polycarbonate" refers to an oligomer or polymer comprising residues of one or more dihydroxy compounds joined by carbonate linkages. The term "polycarbonate" also encompasses poly(carbonate-co-ester) oligomers and polymers.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement techniques of the type described in the present application to determine the value.

The methods comprise reacting a mixture comprising at least one dihydroxy compound and at least one sulfobenzoic acid salt to obtain an intermediate product. The dihydroxy compound has the structure of Formula (I):

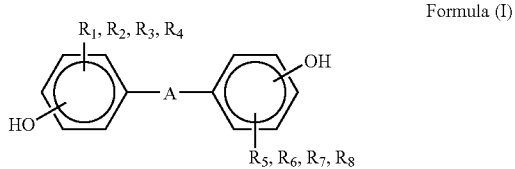

Formula (I)

wherein $R_1$ through $R_8$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl) propane (i.e. bisphenol-A or BPA). Other illustrative compounds of Formula (I) include:
2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;
4,4'-dihydroxydiphenylthioether; and
1,3-bis(2-(4-hydroxyphenyl)-2-propyl)benzene.

The sulfobenzoic acid salt has the structure of Formula (II):

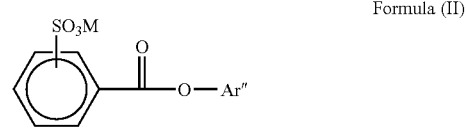

Formula (II)

wherein M is an alkali metal; and Ar" is an aromatic ring. In specific embodiments, M is sodium and Ar" is phenyl. When Ar" is phenyl, the sulfobenzoic acid salt may also be known as the phenyl ester of the sulfobenzoic acid salt. In other specific embodiments, the sulfobenzoic acid salt is the 3-sulfobenzoic acid salt (i.e. the sulfonate group is in the meta position to the acid group).

The dihydroxy compound and sulfobenzoic acid salt are first reacted together to improve the solubility of the salt. In addition, the reaction rate of the activated carbonate with the dihydroxy compound is consistently faster than the reaction rate of the sulfobenzoic acid salt with the dihydroxy compound. Thus, in one-pot reactions of the three compounds, the sulfobenzoic acid salt is unable to react with the dihydroxy compound. As the amount of unreacted dihydroxy compound decreases, its reaction rate with the sulfobenzoic acid salt also decreases.

The molar ratio of dihydroxy compound to sulfobenzoic acid salt can be from about 99.9:0.1 to about 90:10. In specific embodiments, the molar ratio is about 97:3. This ensures a sufficient amount of dihydroxy compound is available to react with the sulfobenzoic acid salt and also ensures that the sulfobenzoic acid salt becomes a terminal end group.

The dihydroxy compound and sulfobenzoic acid salt may be reacted together at a temperature of from about 190° C. to about 230° C. They may be reacted together for a period of from about 60 minutes to about 120 minutes. They may also be reacted together at a pressure of from about 0.5 bar to about 1.5 bar. In specific embodiments, the pressure is atmospheric pressure (1 atm=~1.013 bar); however, a slight overpressure can be used to decrease the loss of the dihydroxy compound due to evaporation. Generally, the temperature is held constant during this reaction. In some specific embodiments, the dihydroxy compound and sulfobenzoic acid salt are reacted for 90 minutes at 210° C. at atmospheric pressure.

The mixture may further comprise a catalyst. The catalyst may be a one-component or multi-component catalyst, such as a catalyst system. In specific embodiments, the catalyst comprises a system of tetramethyl ammonium hydroxide (TMAH) and sodium hydroxide (NaOH). The weight ratio of TMAH to NaOH can be from about 100 to about 500 and in specific embodiments is about 263. Other suitable catalysts for use in polycarbonate synthesis include those described in U.S. Pat. Nos. 6,376,640; 6,303,737; 6,323,304; 5,650,470; and 5,412,061.

After the dihydroxy compound and sulfobenzoic acid salt are fully reacted, at least one activated carbonate is added to the mixture. As used herein, the term "activated carbonate" is defined as a diaryl carbonate which is more reactive than diphenyl carbonate toward transesterification reactions. Such activated carbonates have the structure of Formula (III):

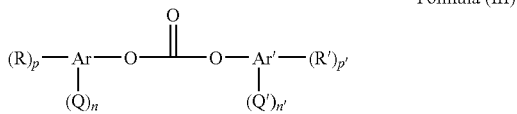

Formula (III)

wherein each Q and Q' is independently an activating group; Ar and Ar' are independently aromatic rings; n and n' are independently whole numbers from zero up to the number of replaceable hydrogen groups on each aromatic ring Ar and Ar', wherein $(n+n') \geq 1$; p and p' are integers; and R and R' are independently selected from alkyl, substituted alkyl, cycloalkyl, alkoxy, aryl, alkylaryl having from 1 to 30 carbon atoms, cyano, nitro, halogen, and carboalkoxy. The number of R groups, p, is an integer and can be zero up to the number of replaceable hydrogen groups on the aromatic ring Ar minus the number n. The number of R' groups, p', is an integer and can be zero up to the number of replaceable hydrogen groups on the aromatic ring Ar' minus the number n'. The number and type of the R and R' substituents on the aromatic rings Ar and Ar' are not limited unless they deactivate the carbonate and lead to a carbonate which is as reactive or less reactive than diphenyl carbonate. Typically, the R and R' substituents are located in the para, ortho, or a combination of the two positions.

Non-limiting examples of activating groups Q and Q' are: alkoxycarbonyl groups, halogens, nitro groups, amide groups, sulfone groups, sulfoxide groups, imine groups, and cyano groups.

Specific and non-limiting examples of activated carbonates include:
bis(o-methoxycarbonylphenyl)carbonate;
bis(o-chlorophenyl)carbonate;
bis(o-nitrophenyl)carbonate;
bis(o-acetylphenyl)carbonate;
bis(o-phenylketonephenyl)carbonate;
bis(o-formylphenyl)carbonate; and
bis(o-cyanophenyl)carbonate.

Unsymmetrical combinations of these structures, where the substitution number and type on Ar and Ar' are different, may also be used.

A preferred structure for an activated carbonate is an ester-substituted diary carbonate having the structure of Formula (IV):

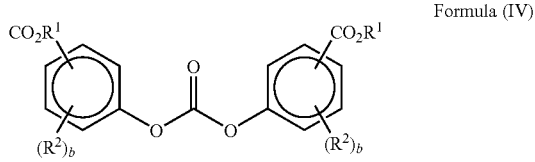

Formula (IV)

wherein $R^1$ is independently a $C_1$-$C_{20}$ alkyl radical, $C_4$-$C_{20}$ cycloalkyl radical, or $C_4$-$C_{20}$ aromatic radical; $R^2$ is independently a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from zero to 4. Preferably, at least one of the substituents $CO_2R^1$ is attached in an ortho position relative to the carbonate group.

Examples of preferred ester-substituted diaryl carbonates include, but are not limited to, bis(methylsalicyl)carbonate (BMSC) (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically bis(methylsalicyl)carbonate is preferred for use in melt polycarbonate synthesis due to its preparation from less expensive raw materials, lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low volatility, and possesses a similar reactivity to bisphenol-A. The model transesterification reaction is carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. A preferred reaction temperature is 200° C. The choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenyl carbonate and is an activated carbonate, whereas a diaryl carbonate which possesses an equilibrium constant of 1 or less is considered to possess the same or a less favorable equilibrium than diphenyl carbonate and is considered to be not activated. It is generally preferred to employ an activated carbonate with very high reactivity compared to diphenyl carbonate when conducting transesterification reactions. Preferred are activated carbonates with an equilibrium constant at least 10 times greater than that of diphenyl carbonate. Use of activated carbonate allows polymerization in a shorter time and at lower temperatures.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated carbonates.

The pressure may be reduced after the activated carbonate is added. In specific embodiments, the pressure is reduced to a range of from about 50 millibar to about 200 millibar after the activated carbonate is added.

The intermediate product and the activated carbonate may then be reacted for a period of from about 30 minutes to about 120 minutes.

The temperature and pressure may be varied while the intermediate product and the activated carbonate are reacted. The pressure may be further reduced to a pressure of from about 0.01 millibar to about 2 millibar during the reaction. This pressure reduction can be done in stages. The temperature may be increased to a temperature of from about 250° C. to about 280° C. while the intermediate product and the activated carbonate are reacted. The temperature and pressure may also be varied and held at certain levels for certain periods of time during this reaction as well.

In specific embodiments, after the activated carbonate is added to the mixture, the pressure is reduced to 130 millibar and the intermediate product and the activated carbonate are reacted for a period of from about 5 minutes to about 30 minutes. The temperature is then increased to 260° C. while the pressure is further reduced to full vacuum (or as close as possible) and the reaction is allowed to proceed for an additional 30 to 45 minutes. The pressure is slowly reduced so that the reaction does not boil too quickly.

A pale yellow and transparent telechelic sulfonated polycarbonate can be obtained from the processes of the present disclosure. The telechelic sulfonated polycarbonate may have the structure of Formula (V):

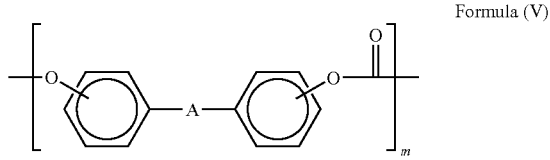

Formula (V)

wherein A is selected from a bond, —O—, —S—, —SO$_2$—, $C_1$-$C_{12}$ alkyl, $C_6$-$C_{20}$ aromatic, and $C_6$-$C_{20}$ cycloaliphatic; and m is the degree of polymerization;

wherein at least 70 mole percent of the end groups of the polycarbonate are sulfonates of Formula (VI):

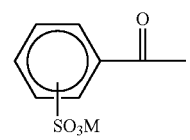

Formula (VI)

wherein M is an alkali metal; and the polycarbonate contains no sulfonate groups in the polycarbonate backbone. In other words, the polycarbonate contains no mixed carbonic-sulfonic anhydride linkages.

The telechelic sulfonated polycarbonate of the present disclosure is completely soluble in solvents such as hexafluoroisopropanol and chloroform. It also has high ionic content and low Fries by-products. In comparison, the polycarbonate produced by the '017 patent has reduced solubility in chlorinated solvents.

The telechelic sulfonated polycarbonate of the present disclosure has a weight average molecular weight of greater than 30,000. In specific embodiments, it has a Mw of about 44,000.

The telechelic sulfonated polycarbonate of the present disclosure is transparent.

FIG. 1 is a diagram illustrating the methods of the present disclosure. In this diagram, exemplary compounds BPA, phenyl 3-sulfobenzoate sodium salt (3-SBENa), and BMSC are used. BPA and 3-SBENa are first reacted together, along with catalysts TMAH and NaOH, to form the intermediate product. BMSC is then added and reacted with the intermediate product to form a telechelic sulfonated polycarbonate.

The methods described herein are also applicable to polycarbonates and copolymers prepared from mixtures and/or combinations of dihydroxy compounds, sulfobenzoic acid salts, and activated carbonates.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Example 1

Part 1: Preparation of Phenyl 3-Sulfobenzoate Sodium Salt

A 1L, 3-neck flask equipped with thermometer, mechanical stirrer and distillation head was filled with 133.3 g (0.67 mol) of sodium 3-sulfobenzoic acid, 288.0 g (1.34 mol) of diphenyl carbonate and 1.5 g (14 millimoles) of sodium carbonate. The flask was placed under a nitrogen atmosphere and the flask heated with a heating mantle. Once the diphenyl carbonate was melted, mechanical stirring was started. When the temperature of the melt reached 300° C., phenol began to distill. The reaction mixture became pasty off-white, then yellow, and eventually black. After about 30 minutes phenol distillation stopped and the heat was removed. The black melt solidified to a yellow solid. After cooling, the solid was removed from the flask and dissolved in approximately 400 mL of water. The aqueous solution was washed twice in 300 mL of methylene chloride and then the water was removed by rotary evaporation to yield the crude product. The solid was suspended in wet ethanol (1-2 percent water) and warmed on a steam bath to form a solution. The solution was hot filtered and then heated on the steam bath to evaporate solvent until crystallization began. The solution was cooled to room temperature and then put in a refrigerator at about 5° C. The product was collected by filtration, dried in a vacuum oven at 90° C., and characterized by $^1$H-NMR analysis. The melting temperature was 287° C.

Part 2: Preparation of Sulfonated Telechelic Polycarbonate

A round bottom wide-neck glass reactor (250 ml capacity) was charged with BPA (25.30 g; 110.8 millimoles), phenyl 3-sulfobenzoate sodium salt (3-SBENa) (1.00 g; 3.32 millimoles), and the catalyst (a mixture of $2.22\times10^{-2}$ millimoles TMAH and $8.43\times10^{-5}$ millimoles of NaOH).

The reactor was closed with a three-neck flat flange lid equipped with a mechanical stirrer and a torque meter. The system was then connected to a water cooled condenser and immersed in a thermostatic oil-bath at 210° C. and the stirrer switched on at 100 rpm after complete melting of the reactants. Samples were taken at 30, 60, and 90 minutes. After 90 minutes, BMSC (36.95 g; 111.9 millimoles) was then carefully added and dynamic vacuum was applied at 130 millibar for 10 minutes. The temperature was then increased to 260° C. in 10 minutes and the pressure decreased to 0.2 millibar. The reaction melt was very viscous after 10 minutes from the application of dynamic vacuum and the stirring was very difficult and slow in the last part of the polymerization. After 45 minutes from the application of the vacuum, the very viscous pale yellow and transparent melt was discharged from the reactor and analyzed by $^1$H-NMR, GPC, DSC and TGA.

Comparative Example 1

For comparison, a sulfonated polycarbonate was prepared according to Example 4 of U.S. Pat. No. 5,644,017. A 250 mL glass reactor was filled with diphenyl carbonate (DPC) (11.92 g, 55.7 millimoles), BPA (12.08 g, 53 millimoles), and 3-SBENa (0.477 g, 1.59 millimoles). The reactor was evacuated and purged with nitrogen 3 times and then the reaction mixture was heated to 220° C. under an argon atmosphere. Aqueous LiOH (10.7 µL of 0.132M solution) was injected into the stirred reaction mixture resulting in immediate vigorous boiling. The reaction pressure was reduced to 40 millibar in 25 min and then down to 0.1 millibar. At this point the reaction melt was viscous. The reaction temperature was increased to 280° C. and maintained at that temperature for 5 minutes at full vacuum (0.1 millibar). The final, dark yellow, very viscous material was recovered from the reactor. The material was not soluble in CHCl$_3$, CF$_3$COOH, or hexafluoroisopropanol.

Example 2

The method of Comparative Example 1 was slightly modified by reducing the amount of catalyst and using a 2-component catalyst. A 250 mL glass reactor was filled with DPC (11.92 g, 55.7 millimoles), BPA (12.08 g, 53 millimoles), and 3-SBENa (0.477 g, 1.59 millimoles). The reactor was evacuated and purged with nitrogen 3 times and then the reaction mixture was heated to 220° C. under an argon atmosphere. Aqueous NaOH (13.0 µL of 0.15 M solution) and TMAH (13.0 µL of 1M solution) were injected into the stirred reaction mixture resulting in immediate vigorous boiling. The reaction was kept at 180° C. at atmospheric pressure for 15 minutes. The temperature was then increased to 210° C. and the pressure was reduced down to 250 millibar, then down to 130 millibar for 30 minutes. The temperature was then increased to 240° C. and the pressure was reduced to 20 millibar and kept at these conditions for an additional 30 minutes. The temperature was then increased to 270° C. and the pressure reduced to 2.5 millibar and kept at these conditions for an additional 10 minutes. The temperature was then increased to 310° C. and the pressure was reduced to 0.5 millibar and kept at these conditions for an additional 20 minutes. The final, yellow, very viscous material was recovered from the reactor. The final material was completely soluble in CHCl$_3$. The $^1$H-NMR analysis showed the presence of Fries rearrangement by-products.

Analysis

Figure 2:
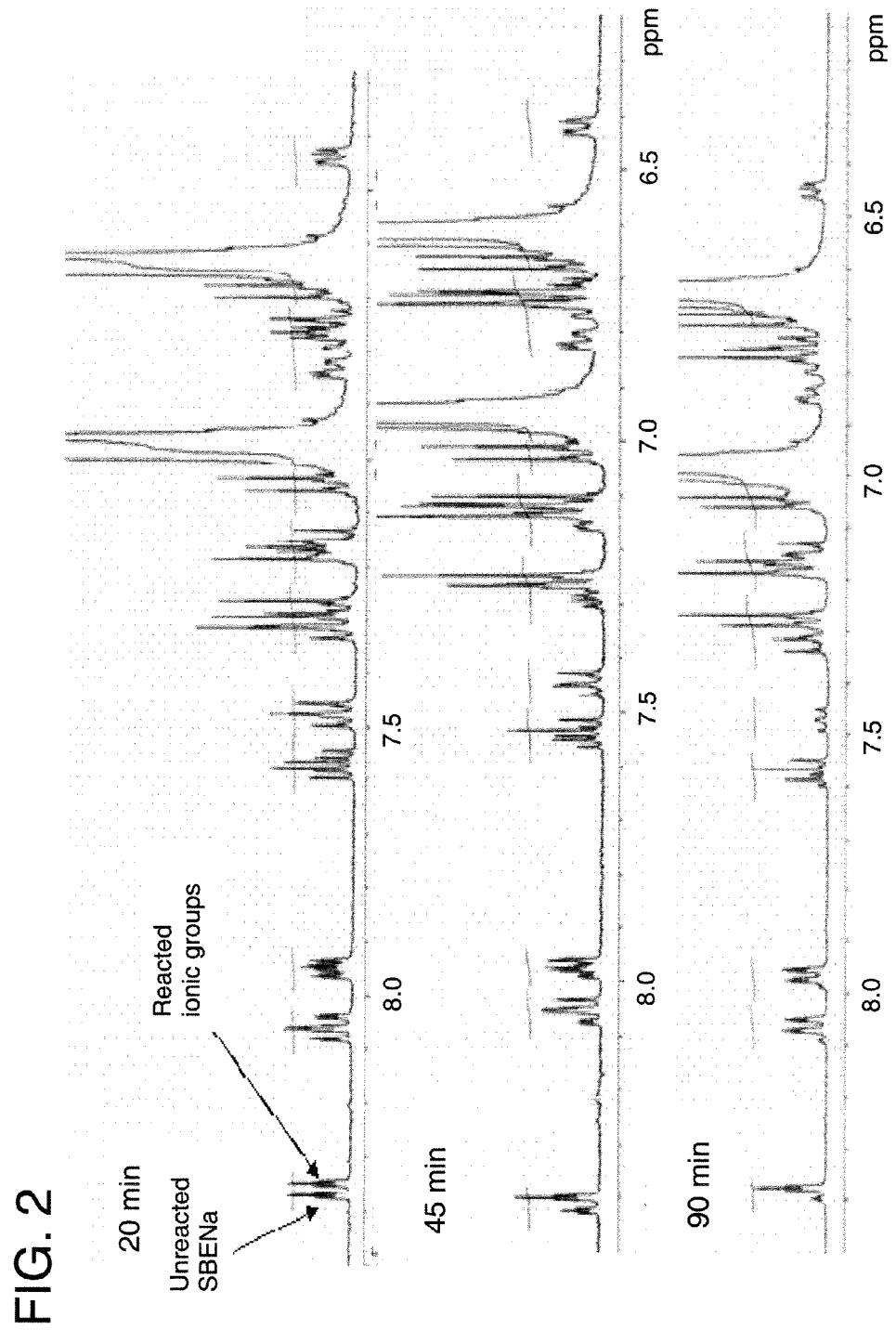
FIG. 2 is $^1$H-NMR spectra of samples taken from the methods of the present disclosure.

The NMR spectra of the samples taken at 30, 60, and 90 minutes of Example 1 (during the reaction between BPA and 3-SBENa) are shown in FIG. 2. In particular, the peaks at 8.40 and 8.43 ppm belong to reacted and unreacted 3-SBENa, respectively. After 90 minutes, most of the 3-SBENa has been reacted, as seen by the diminished peak at 8.43 ppm.

Figure 3:
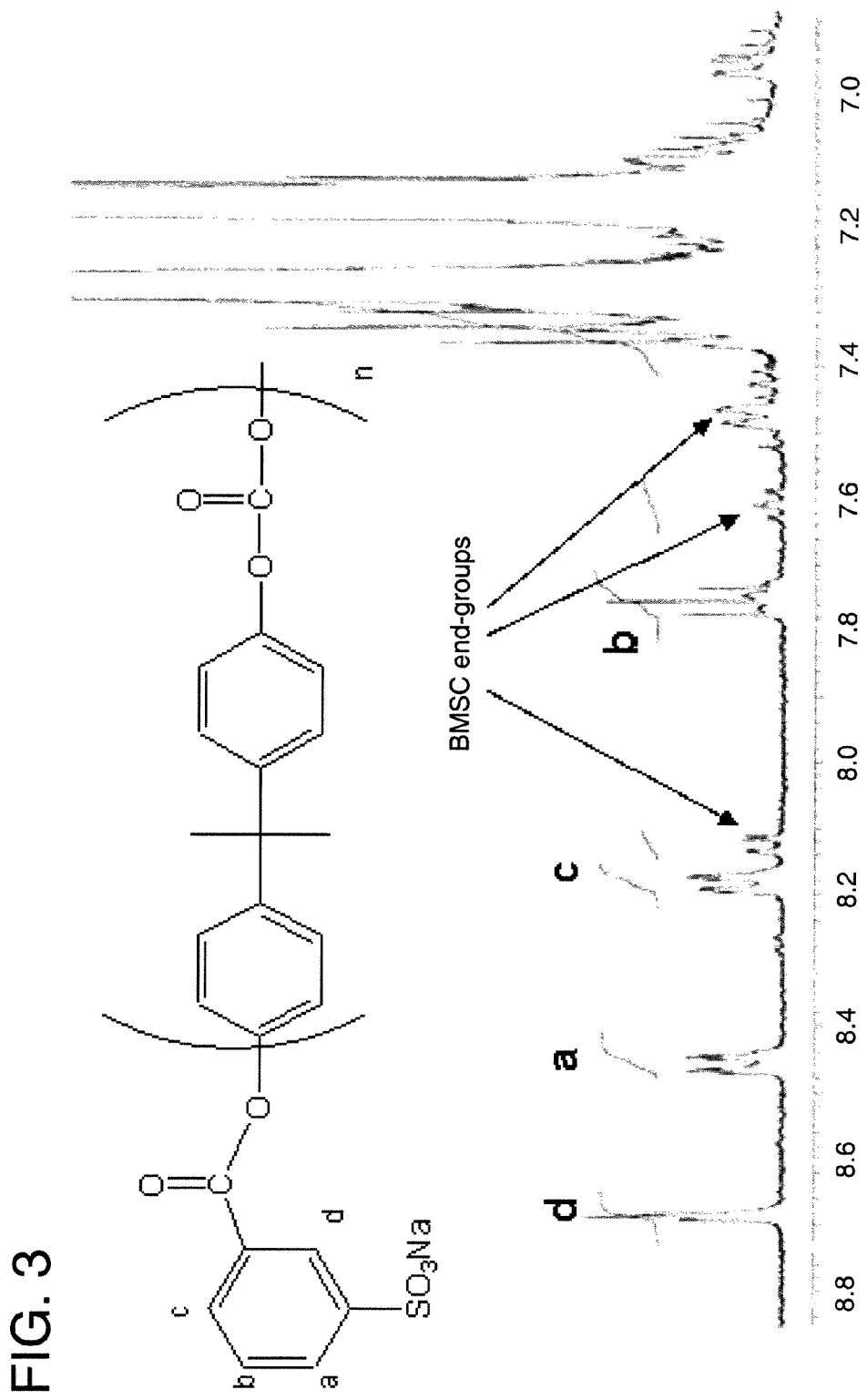
FIG. 3 is a $^1$H-NMR spectrum of the telechelic sulfonated polycarbonate produced by the methods of the present disclosure.

The NMR spectrum of the telechelic polycarbonate of Example 1 is shown in FIG. 3. Again, there is no peak at 8.43 ppm, indicating that all 3-SBENa has been reacted. There is also no peak at 8.1 ppm due to Fries by-products. The end-groups are mainly ionic (over 75%) and the other end-groups derive mainly from BMSC. No phenolic end-groups are present.

A weight average molecular weight (Mw) of 44,000 (as measured by GPC in a hexafluoroisopropanol/chloroform 5/95 v/v mixture, vs. polystyrene standards) was obtained. The amount of the excess depends on the reactor geometry and whether an argon purge is used. However, the stoichiometry can be easily balanced by measuring the amount of end groups deriving from BPA or BMSC (using 1H-NMR).

Figure 4:
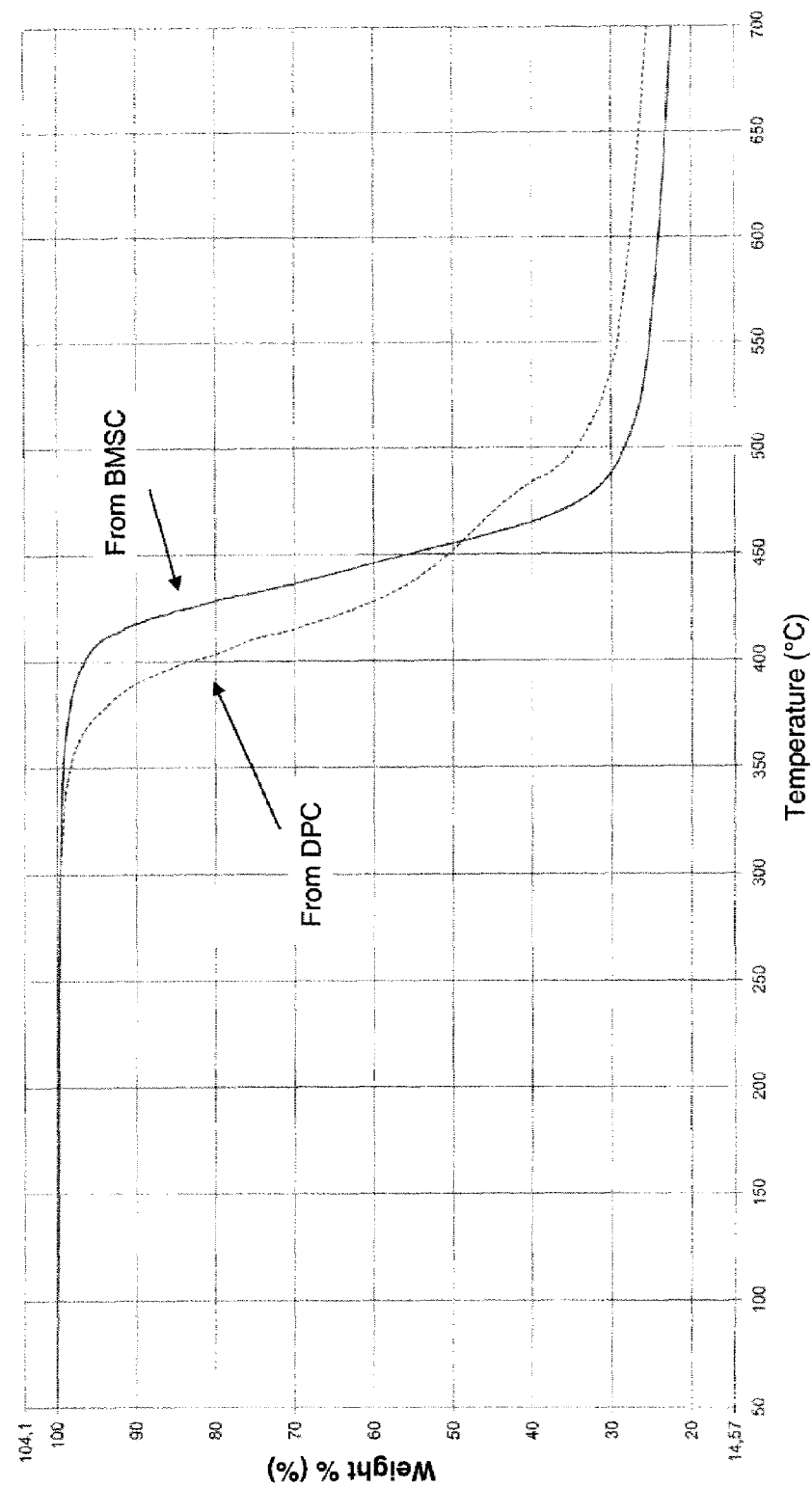
FIG. 4 is a thermigravimetric analysis comparing a polycarbonate produced by the methods of the present disclosure against the prior art.

The TGA analysis of the telechelic polycarbonate of Example 1 and the polycarbonate of Example 2 is shown in FIG. 4. The analysis shows that the polycarbonate prepared using BMSC is consistently more stable compared to the polycarbonate prepared using DPC. The decomposition temperature for the polycarbonate of Example 2 is lower than that for Example 1. Quantitatively, 5% weight loss occurs at about 420° C. for the polycarbonate prepared using BMSC, versus at about 275° C. for the polycarbonate prepared using DPC. Furthermore, the polycarbonate prepared using DPC was consistently darker (i.e. less transparent) than that prepared using BMSC. However, the polycarbonate of Example 2 is also soluble (i.e. not crosslinked), as is the polycarbonate of Example 1.

The polycarbonate of Example 1 had a glass transition temperature of 147° C., as measured by DSC. No trace of crystallinity was detected.

Comparative Example 1 shows that the methods of the '017 patent produce a crosslinked, insoluble sulfonated polycarbonate. Example 2 provides a soluble, non-crosslinked polycarbonate. A further improvement is shown in Example 1, which has a higher Mw and completely eliminated Fries byproducts.

The telechelic sulfonated polycarbonates of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for the melt synthesis of a telechelic sulfonated polycarbonate, comprising:
   first reacting a mixture comprising a dihydroxy compound and a sulfobenzoic acid salt and a catalyst to obtain an intermediate product at a temperature of from about 190° C. to about 230° C.;
   adding an activated carbonate to the mixture; and
   then reacting the intermediate product with the activated carbonate to obtain the telechelic sulfonated polycarbonate;
   wherein the dihydroxy compound has the structure of Formula (I):

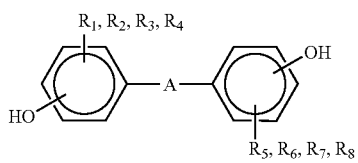

Formula (I)

wherein $R_1$ through $R_8$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic;
   the sulfobenzoic acid salt has the structure of Formula (II):

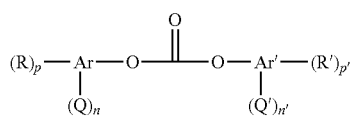

Formula (III)

wherein M is an alkali metal; and Ar" is an aromatic ring; and the activated carbonate has the structure of Formula (III):

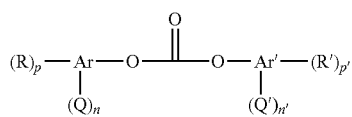

Formula (III)

wherein each Q or Q' is independently selected from alkoxycarbonyl, halogen, nitro, amide, sulfone, sulfoxide, imine, and cyano; Ar and Ar' are independently aromatic rings; n and n' are independently whole numbers from zero up to the number of replaceable hydrogen groups on each aromatic ring Ar and Ar', wherein (n+n')≧1; p is an integer from zero up to the number of replaceable hydrogen groups on aromatic ring Ar minus n; p' is an integer from zero up to the number of replaceable hydrogen groups on aromatic ring Ar' minus n'; and each R or R' is independently selected from alkyl, substituted alkyl, cycloalkyl, alkoxy, aryl, alkylaryl having from 1 to 30 carbon atoms, cyano, nitro, halogen, and carboalkoxy.

2. The method of claim 1, wherein the molar ratio of dihydroxy compound to sulfobenzoic acid salt is from about 99.9:0.1 to about 90:10.

3. The method of claim 1, wherein the dihydroxy compound and sulfobenzoic acid salt are reacted for a period of from about 60 minutes to about 120 minutes.

4. The method of claim 1, wherein the dihydroxy compound and sulfobenzoic acid salt are reacted at a pressure of from about 1.0 bar to about 1.5 bar.

5. The method of claim 1, wherein the pressure is reduced to a range of from about 50 millibar to about 200 millibar after the activated carbonate is added.

6. The method of claim 1, wherein the temperature is increased to a temperature of from about 250° C. to about 280° C. while the intermediate product and the activated carbonate are reacted.

7. The method of claim 1, wherein the pressure is reduced to a pressure of from about 0.01 millibar to about 2 millibar while the intermediate product and the activated carbonate are reacted.

8. The method of claim 1, wherein the intermediate product and the activated carbonate are reacted for a period of from about 30 minutes to about 120 minutes.

9. The method of claim 1, wherein the catalyst is a system of tetramethyl ammonium hydroxide (TMAH) and sodium hydroxide (NaOH).

10. The method of claim 1, wherein the telechelic sulfonated polycarbonate has a weight average molecular weight of greater than 30,000.

11. The method of claim 1, wherein the dihydroxy compound is 2,2-bis(4-hydroxyphenyl) propane (bisphenol-A).

12. The method of claim 1, wherein the sulfobenzoic acid salt is the phenyl ester of sulfobenzoic acid sodium salt.

13. The method of claim 1, wherein the activated carbonate is bis(methylsalicyl)carbonate (BMSC).

14. A method for the synthesis of a telechelic sulfonated polycarbonate, comprising:
   first reacting a mixture comprising bisphenol-A, a phenyl ester of a sulfobenzoic acid sodium salt, and a catalyst to obtain an intermediate product at a temperature of from about 190° C. to about 230° C.; and
   then reacting the intermediate product with bis(methylsalicyl) carbonate (BMSC) to obtain the telechelic sulfonated polycarbonate.

15. The method of claim 14, wherein the mixture is reacted for about 90 minutes at a temperature of about 210° C.

16. The method of claim 14, further comprising reducing the pressure to 130 millibar during the reaction of the intermediate product with BMSC.

17. The method of claim 16, wherein after the pressure is reduced to 130 millibar, the temperature is increased to about 260° C. and the pressure is further reduced to about 0.1 millibar.

18. A telechelic sulfonated polycarbonate, wherein at least 70 mole percent of the end groups of the polycarbonate are sulfonates of Formula (VI):

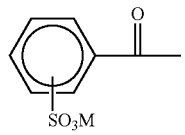

Formula (VI)

wherein M is an alkali metal and wherein the polycarbonate has a weight average molecular weight of greater than 30,000 as measured by as measured by GPC versus polystyrene standards.

19. The polycarbonate of claim 18, wherein the polycarbonate is formed from the reaction of a dihydroxy compound and an activated carbonate.

20. The polycarbonate of claim 18, wherein the polycarbonate is completely soluble in chloroform.

21. The polycarbonate of claim 18, wherein the polycarbonate is transparent.

22. The telechelic sulfonated polycarbonate produced by the method of claim 1.

* * * * *